(12) United States Patent
Mahadevaiah

(10) Patent No.: US 6,659,176 B2
(45) Date of Patent: Dec. 9, 2003

(54) METHOD FOR MONITORING REMEDIATION OF NON AQUEOUS PHASE SOLUTION

(76) Inventor: Raj Mahadevaiah, 245 Seale La., Alpharetta, GA (US) 30022

( * ) Notice: Subject to any disclaimer, the term of this patent is extended or adjusted under 35 U.S.C. 154(b) by 0 days.

(21) Appl. No.: 10/012,714

(22) Filed: Dec. 7, 2001

(65) Prior Publication Data

US 2002/0166666 A1 Nov. 14, 2002

Related U.S. Application Data

(63) Continuation of application No. 08/938,714, filed on Sep. 26, 1997, now abandoned.
(60) Provisional application No. 60/026,818, filed on Sep. 27, 1996.

(51) Int. Cl.$^7$ ................................................ E21B 43/00
(52) U.S. Cl. ......................... 166/250.15; 166/250.03; 166/369; 166/69; 166/67
(58) Field of Search .................... 166/250.15, 369, 166/250.03, 67, 69

(56) References Cited

U.S. PATENT DOCUMENTS

| 2,342,913 A | 2/1944 | Williams et al. |
|---|---|---|
| 3,063,500 A | 11/1962 | Logan |
| 3,774,685 A | 11/1973 | Rhodes |
| 4,936,768 A | 6/1990 | Lupke |
| 4,962,847 A | 10/1990 | Pisors et al. |
| 5,016,708 A | 5/1991 | Baer et al. |
| 5,080,781 A | 1/1992 | Evins, IV |
| 5,232,051 A | 8/1993 | Daly |
| 5,789,662 A * | 8/1998 | Dayal ........................... 73/38 |
| 5,928,520 A | 7/1999 | Haumesser |

OTHER PUBLICATIONS

"A Review of Immiscible Fluids in the Subsurface: Properties, Models, Characterization and Remediation", Journal of Contaminant Hydrology, Jun. 1990, pp. 107–163.*

Mr. Raj Mahadevaiah, P.E., Non–Aqueous Extraction Technique (NET), Dec. 1998, pp. 1–4.*

* cited by examiner

Primary Examiner—Heather Shackelford
Assistant Examiner—Sunil Singh
(74) Attorney, Agent, or Firm—Arnall Golden Gregory LLP

(57) ABSTRACT

A method and apparatus for remediation of non-aqueous phase liquids (NAPL), including the use of a prior art hydrophobic adsorption system including a continuous loop of adsorptive material, with a weighted pulley on the free end of the loop to allow for the loop to be placed within a well being deeper than it is wide.

10 Claims, 5 Drawing Sheets

OIL MOP SYSTEM LAYOUT

METHOD FOR MONITORING REMEDIATION OF NON AQUEOUS PHASE SOLUTION

RELATED APPLICATIONS

This application is a continuation of U.S. patent application Ser. No. 08/938,714, filed Sep. 26, 1997 now abandoned which claims priority of provisional patent application No. 60/026,818, filed Sep. 27, 1996.

TECHNICAL FIELD

This invention relates in general to environmental cleanup, and particularly relates to the recovery of non-aqueous phase liquids (NAPL) from subsurface formations.

BACKGROUND OF THE INVENTION

The recovery of non-aqueous phase liquids (NAPL) from subsurface formations poses a significant technical and financial burden due to the inefficiency of recovering NAPL and due to the production of vast quantities of contaminated ground water during the recovery process. The prevailing pump-and-treat techniques are incapable of effectively addressing these issues and have therefore resulted in poorly designed recovery systems. Alternative techniques, such as soil vapor extraction (SVE) and vapor enhanced recovery, are not only costly but are also limited by subsurface conditions. Also, the ability to assess the efficiency of any recovery technique has been hampered by the complexities of subsurface operating conditions.

These factors can lead to an erroneous assumption that asymptotic recovery rates have been established despite the fact that significant hydrocarbons can still be recovered from the subsurface. By continuing these low recovery rates for an extended period of time, the overall cost of the recovery process increases dramatically. Environmental restrictions on the disposal of contaminated ground water pose an additional financial burden on the industry.

The end result is that the prevailing conventional recovery processes, over the long term, produces mostly water and dismal amounts of product. These inefficiencies are present not only in shallow environmental recovery processes but also in relatively deep mineral oil exploration processes.

In the case of shallow environment recovery processes, due to NAPL releases at conveyance, storage, and distribution facilities, the main goal is to economically recover the NAPL in order to limit environmental liabilities. However, the subsurface conditions are so complex that the prevailing technologies for removal processes can be significantly restricted. In addition, many of the current techniques prematurely reach asymptotic recovery levels, which significantly increases the cost of NAPL recovery. Several of the limitations caused by these restrictions include:

1) improperly designed subsurface collection sources that hinder the effective mobilization of the product;
2) variable water table elevations that render fixed intake pumps impractical, as the intakes are not ideally submerged in the NAPL;
3) techniques that use probes to position the intakes of dual phase pumps are not only labor intensive but ineffective to optimize the recovery process;
4) product recovery pumps equipped with hydrophobic membranes are also limited in its application as the membranes are subjected to chronic failures as in the case of biofouling;
5) total fluid pumps produce large amount of contaminated ground water in relation to the amount of NAPL collected, and
6) soil vapor extraction or vapor enhanced recovery processes are costly and limited in applications.

Therefore there is a need in the art to provide an improved NAPL extraction technique which not only enhances the recovery of NAPL but significantly reduces the recovery of water, and is easier to erect and maintain.

SUMMARY OF THE INVENTION

The present invention overcomes deficiencies in the prior art by providing an improved NAPL extraction technique which not only enhances the recovery of NAPL but significantly reduces the recovery of water, is easy to operate, and is easy to erect and maintain.

Therefore it is an object of the present invention to provide an improved NAPL extraction technique (NET).

It is a further object of the present invention to provide an improved NAPL extraction technique (NET) for the efficient recovery of NAPL from shallow subsurface formations.

It is a further object of the present invention to provide an improved NAPL extraction apparatus for the recovery of NAPL from shallow subsurface formations.

It is a further object of the present invention to provide an improved NAPL extraction apparatus for the efficient recovery of NAPL from shallow subsurface formations.

It is a further object of the present invention to provide an improved NAPL extraction apparatus for the effective recovery of NAPL from shallow subsurface formations.

It is a further object of the present invention to provide an improved NAPL extraction apparatus for the reliable recovery of NAPL from shallow subsurface formations.

It is a further object of the present invention to provide an improved NAPL extraction apparatus for the predictable recovery of NAPL from shallow subsurface formations.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENTS

The method and apparatus according to the present invention can at least be partially used in either a shallow subsurface environment or a deep subsurface environment.

Shallow Subsurface Environment

To compensate for the inefficiencies associated with conventional recovery techniques, the applicant has developed a NAPL extraction technique (NET) for the efficient recovery of NAPL from shallow subsurface formations and an apparatus therefor. The NET not only enhances the recovery of NAPL but significantly reduces the recovery of water. The key to a successful application of NET is careful design, implementation, operation, and monitoring or a recovery system based on site specific conditions. The design phase consists of developing an optimal hydrophobic adsorption system which can be placed within a subsurface collection source. The collection source is designed to provide optimal mobilization of the NAPL for the designed recovery tool, based on a detailed evaluation of the site conditions. The system is then implemented within the collection source to recover the mobilized NAPL. During the first few weeks of the implementation phase, the effectiveness of the tool is tested by monitoring the subsurface in the surrounding formation. Optimal recovery is achieved by continuously monitoring the NAPL thickness, water-table elevations, the conditions within the collection source, and product-water ratios of the recovered fluids. To overcome the drawbacks of a three dimensional variable consisting of time, product thickness, and fluctuating water table conditions, the applicant developed a ground water factoring technique which reduces the three dimensional variable into two dimensional variable consisting of time and product thickness. The two dimensional variable can then be applied using any available statistical package for projecting cleanup time and identifying new release source(s).

Figure 1:
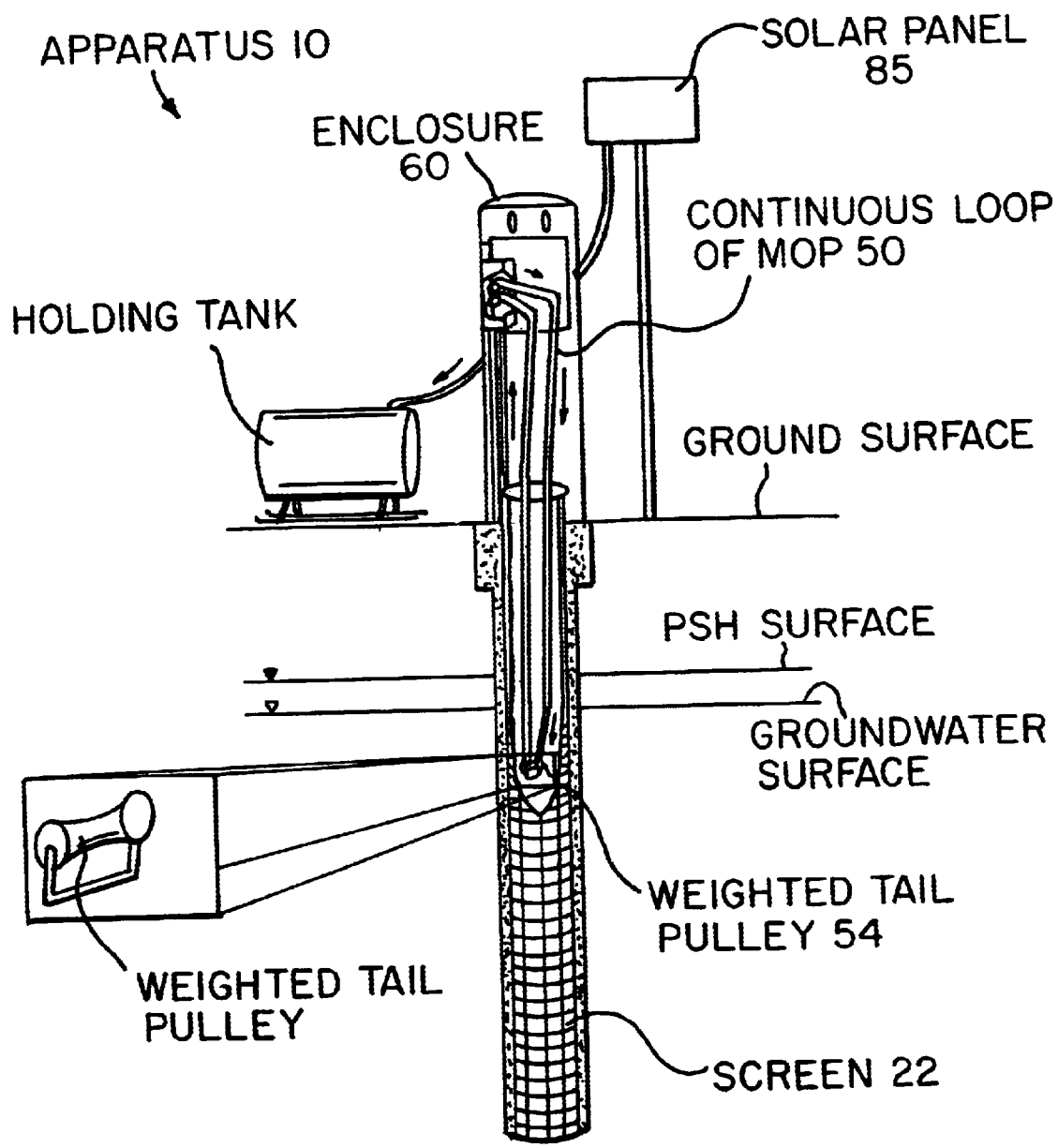
FIG. 1 is an overall view of an apparatus according to the present invention 10 including a solar panel 100
Figure 2:
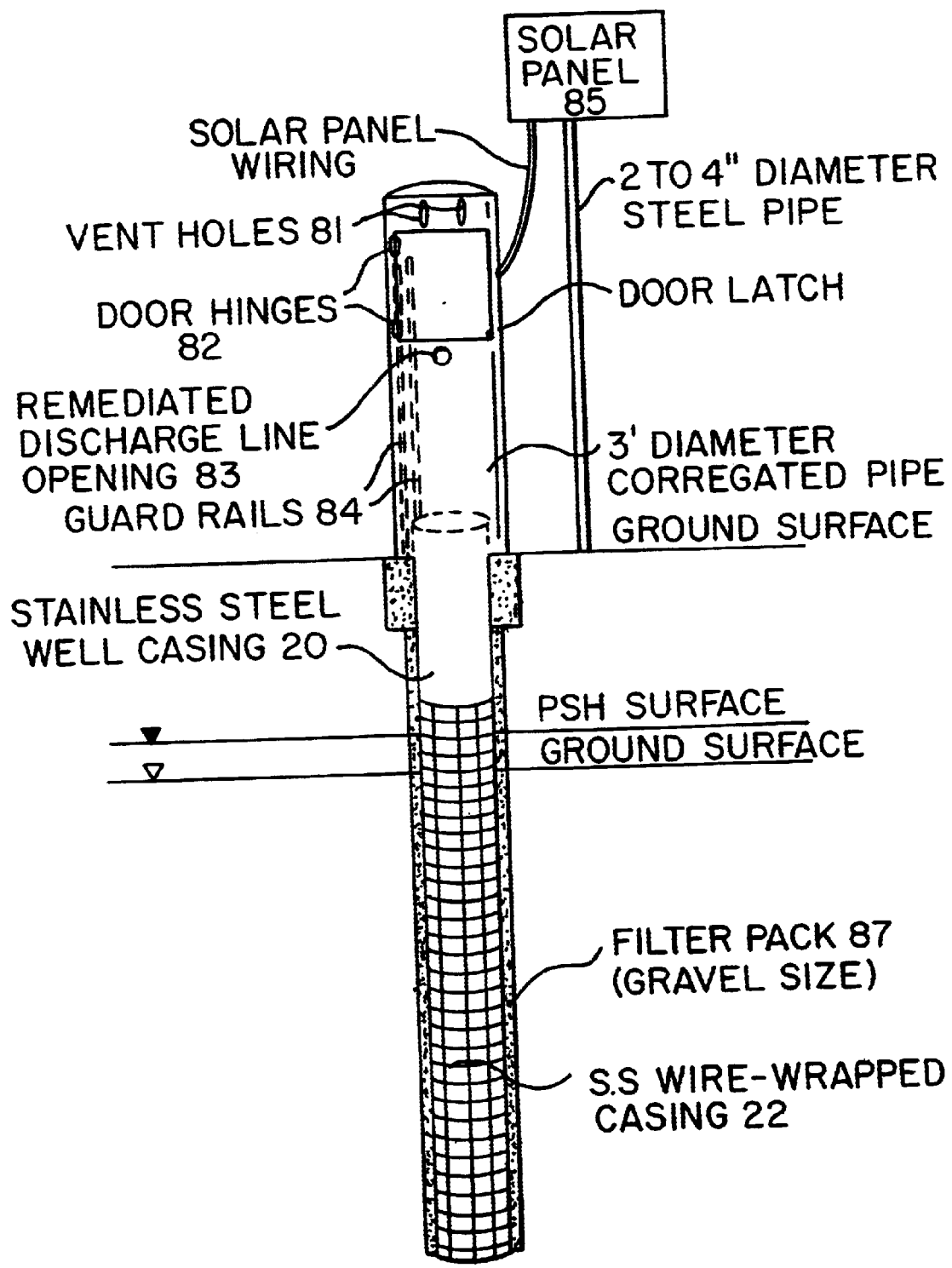
FIG. 2 is another view of the system of FIG. 1.
Figure 3:
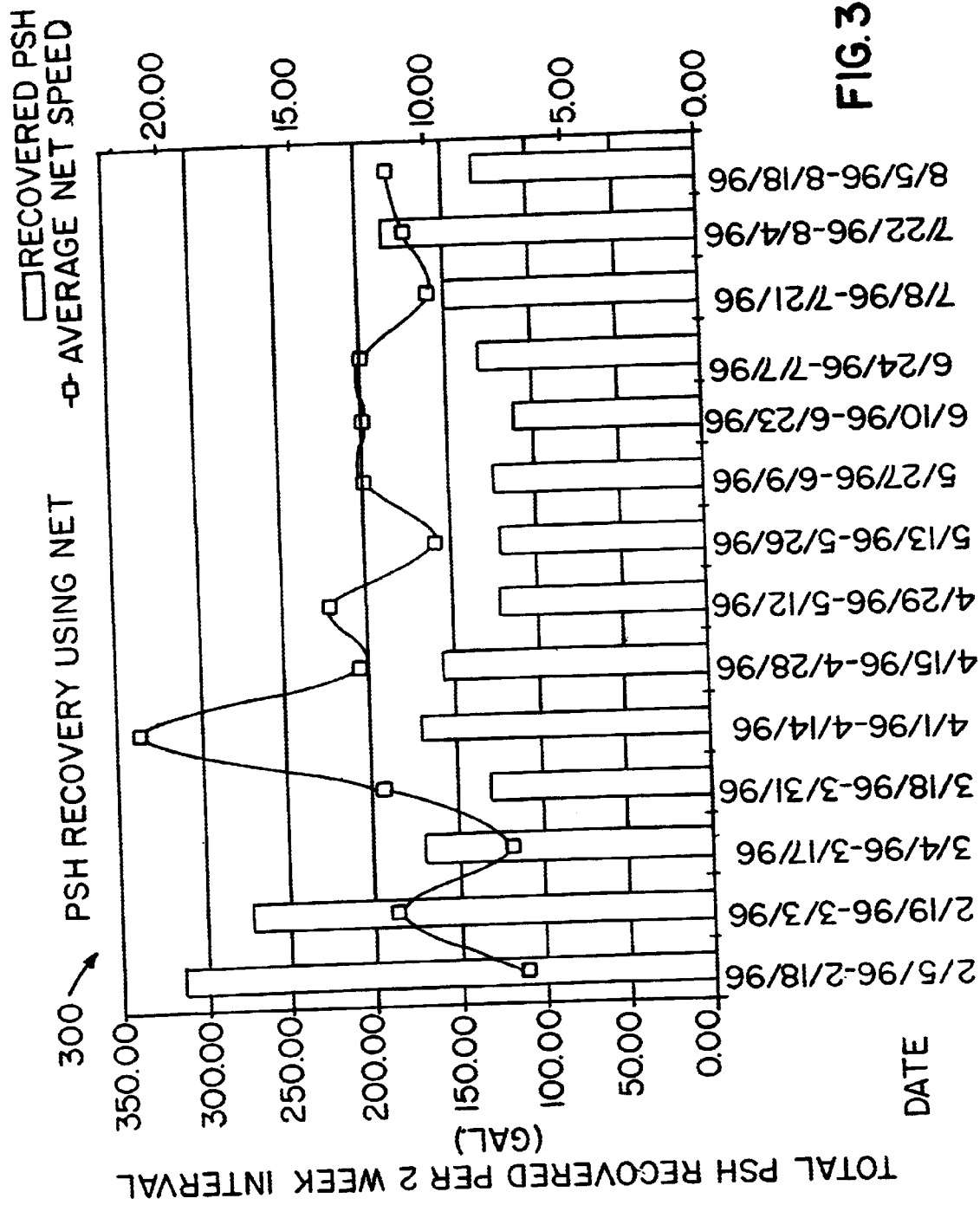
FIG. 3 is a chart 300 showing recovery rates possible under the invention.

The applicant has successfully implemented the NET for recovery of light non-aqueous phase liquids (LNAPL) at an active petroleum storage terminal. The terminal receives, stores, and distributes various grades of petroleum products. During site investigations, LNAPL, consisting of phase separated hydrocarbons (PSH), was identified in the subsurface. The PSH was present on a water-table, which was tidally influences by a river located approximately 100 feet away (FIG. 1). The water-table was located at a depth of 8 to 12 feet below grade. The subsurface geology consisted of 8 to 10 feet of silt and clay overlain on a medium sand strata.

A remedial program has been initiated to recover PSH accumulated on the water-table. The remedial program consisted of conventional pump-and-treat remedial techniques including skimmer pumps, total fluid pumps, and pumps equipped with hydrophobic membranes installed in selected monitoring and recovery wells.

To further reduce the extent of PSH, the applicant applied the NET for optimal recovery of PSH. The first step involved the design and installation of a collection source apparatus 10 used within a stainless steel recovery well 20 (placed within a dug hole) equipped with a wire-wrapped screen 22. The screen 22 was positioned to a level where the NAPL accumulated on either the upper-most or the lower-most water table elevation would infiltrate into the collection well. A continuous loop hydrophobic adsorption system 50 such as known in the art and as provided by OIL-MOP of Belle Chase, Calif., is equipped with a continuous loop 52 of braided nylon bristles which is suspended on a pulley 54 as shown in FIG. 1. The adsorption system was positioned in the recovery well with a weighted bottom-pulley (not part of the OIL-MOP system but provided by applicant) to ensure that the mop is partially submerged in the NAPL. A surface enclosure 60 is provided using corrugated steel pipe (CSP) to house the mop assembly. A motor 70 drives the pulley and the associated electrical connections is set up on a steel structure immediately outside the CSP, although other locations are possible.

The corrugated pipe is 3 feet in diameter. The stainless steel casing is 2 feet in diameter, and include a "tube" screen extending downwardly from its lower edge, which is likewise 2 feet in diameter. The casing/screen assembly is buried in a 2.5 foot well hole with gravel between the casing/screen assembly and the well wall.

During the recovery process, the hydrophobic adsorption system travels in a continuous loop recovering fluids from the well. The adsorbed fluids is separated from by passing the braided nylon bristles through a surface mounted wringer. The separated fluids are then conveyed to a holding tank by gravity feed process.

The apparatus according to the present invention has been able to recover nearly water-free PSH at rates of up to 12 gallons per hour, and thousands of gallons of PSH have been recovered.

Assessing the effectiveness and progress of a remediation program in a tidally influenced subsurface environment is nearly impossible using conventional techniques. The NET water table factoring technique was then used to assess the remedial progress by factoring out the influence of tidal fluctuations. Based on the results of the assessment program, it was apparent that NET would recover the prevailing hydrocarbons in the surrounding formation substantially faster than conventional pump and treat techniques if no new PSH sources contributed to the existing plume. In comparing the cleanup times for recovery of hydrocarbons, the results were startling. The NET process accomplished recovery rates at a 95% savings in cleanup time. The save amount recovered using NET within a period of six months would have been realized in a period of nine years using prevailing pump-and-treat techniques.

NET reduced the overall LNAPL recovery costs at the site by 80%. On the capital investment costs, NET saved well over 70% compared to the conventional pumping techniques. In the operation and maintenance phase, NET saved in excess of 90% over conventional pumping techniques. NET also saved 100% on the disposal costs.

Figure 4:
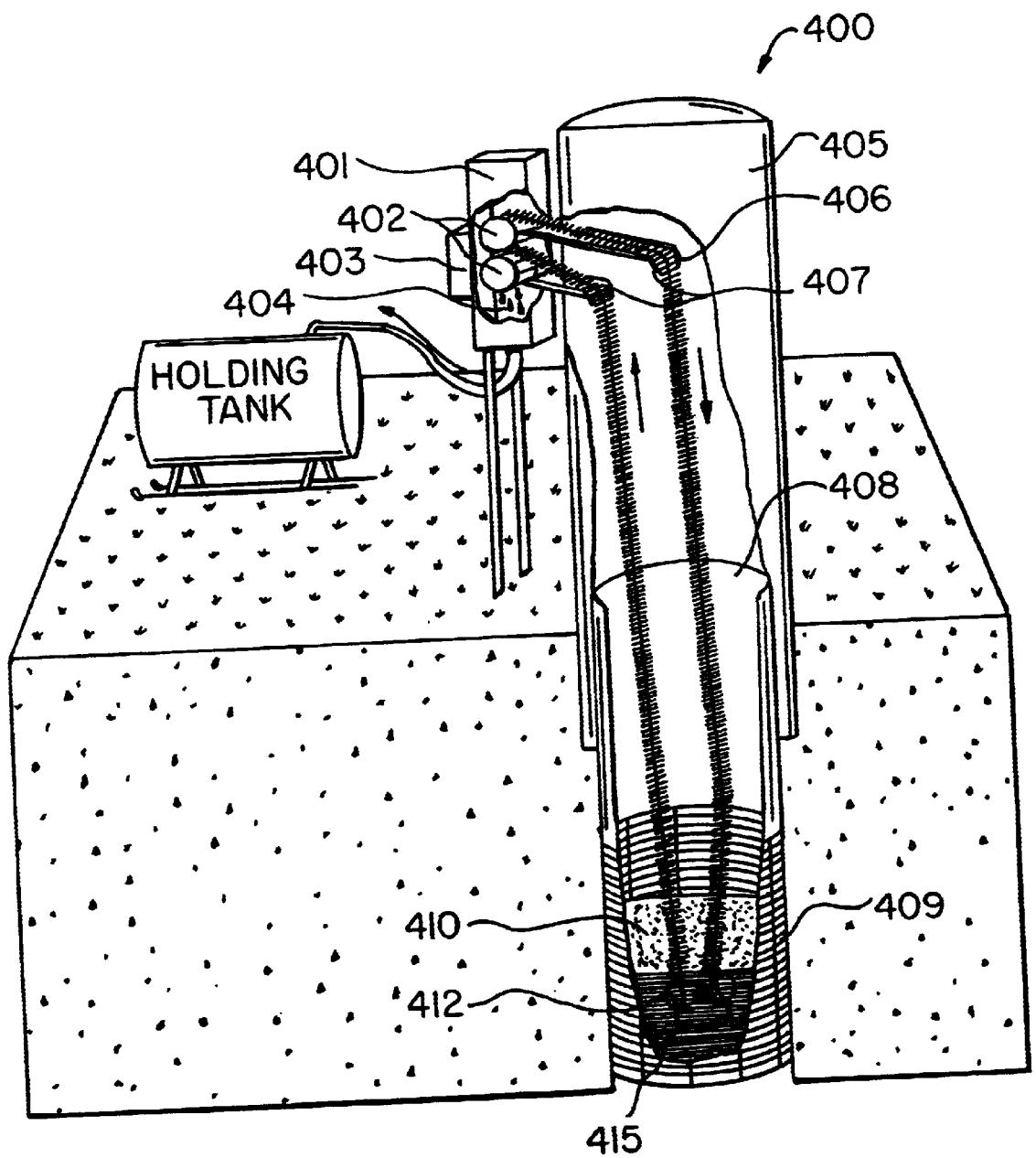
FIG. 4 is a view of a similar system 400 according to the present invention.

FIG. 4 shows an alternate apparatus 40 which does not include solar capability but includes a motor housing 401, squeegee rollers 402 (to squeeze the endless mop 420), a control panel 403, dripping product 404 going to a holding tank 450, corrugated steel pip 405, hydrophobic braided nylon bristles 406 being part of the mop 420, troughs 407, a recovery well 408, a wire-wrapped screen 409, phase-separated hydrocarbons 410, a weighted bottom-pulley 412, and groundwater 415.

In summary, the NET proved to be simple, practical, and cost-effective in recovering the recoverable PSH remaining at the site.

Deep Subsurface Environment

In the case of deep subsurface environmental recovery process, typical of deep exploration of petroleum from on-shore and off-shore, the main goal is to recover primarily water-free NAPL. The prevailing technologies for removal process are however restricted by several variable. The recovery of petroleum from even the best producing oil wells will prematurely reach asymptotic recovery rates over time. The end result is that the prevailing recovery process produces mostly water and dismal amounts of product. This has rendered many wells throughout the world uneconomical for further exploitation.

Applicant has also developed a conceptual design by modifying the NET version for recovery of NAPL from deep subsurface formations found in deep oil exploration, by providing a "extraction module" (not shown), which is relatively self-contained and can be dropped down over 50 feet. This "extraction module" can include an endless mop such as described above, except it is much smaller and is a "down-hole" assembly. The module will includes its own sump reservoir which will accept remediated product so that the product can be pumped to the surface by suction or positive pressure, by air or by electricity. This system differs in that the module is at least partially submerged in the water and the NAPL layer.

Assessing the Effectiveness of the Remediation Program

Assessing the effectiveness and progress of a remediation program in a tidally influenced subsurface environment is nearly impossible using conventional techniques. The NET water table factoring process was then used to assess the remedial progress by factoring out the influence of tidal fluctuations.

Figure 5:
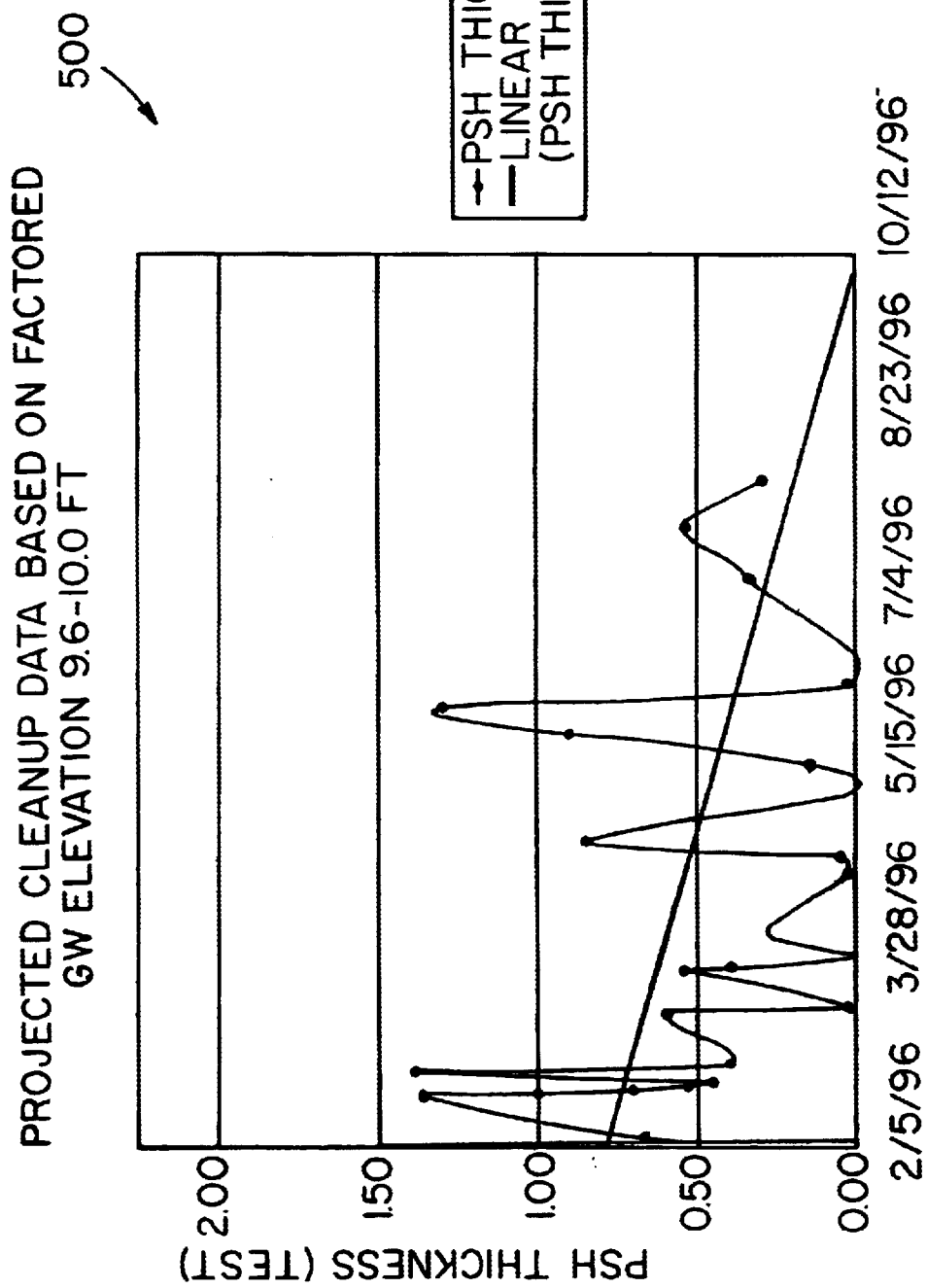
FIG. 5 is a chart showing PSH thickness along one axis, and time on the other axis, for presorted historical data for factored ground water elevation, as an example, 9.6–10.0 feet, and 9.8 plus or minus 0.2 feet.

The factoring process involved successive discrimination of historic monitoring data to determine the most persistent ground-water elevation for a median hydrocarbon thickness. The monitoring data was the queried to obtain historic product thickness data corresponding to the persistent ground-water elevation. The end result was a two dimensional variable set consisting of time and product thickness data for the corresponding ground-water elevation. The two dimensional data set was then plotted with time as a variable of x-axis and product thickness as a variable on the y-axis as illustrated in FIG. 5.

The following steps outline one method of accomplishing the factoring process.

Step 1: Assemble monitoring information consisting of original historic well gauging data. This is a three dimensional data consisting of product thickness, ground water elevation, and time variables. Sort the data to develop a set of ground water elevation measurements where a PSH (phase separated hydrocarbon) thickness of >0.01 feet was measured.

Step 2: Query the data to find the most persistent ground-water elevation measured within a range of 0.2 feet or more feet (i.e. a range of 0.4 feet as noted in example illustrated as FIG. 5). As noted in the example, the most persistent ground-water elevation was computed as 9.8+/−0.2 ft.

Step 3: Go back to original historic well gauging data and sort historic product thickness data corresponding to the persistent ground-water elevation. The resulting two-dimensional set or product thickness over time is considered data factored for a fixed groundwater elevation range.

Step 4: The factored two dimensional variable set is plotted with time as a variable of x-axis and product thickness as a variable of y-axis.

Step 5: The resulting graph provides a basis for projection of cleanup under the prevailing conditions. The date can also be used to identify new spills.

Step 6: Conduct several iterations of Steps 1 through 5 for a median thickness low thickness, and peak thickness to calibrate the projections.

Based on the results of the factoring process, it was apparent that the prevailing hydrocarbons in the surrounding formation would be recovered substantially faster than conventional pump and treat techniques.

Conclusion

While this invention has been described in specific detail with reference to the disclosed embodiments, it will be understood that many variations and modifications may be effected within the spirit and scope of the invention as described in the appended claims.

What is claimed is:

1. A method for detecting an increase in the amount of a non-aqueous phase liquid during a process for remediating a layer of non-aqueous phase liquids from a surface of water in an environment, the method comprising:

determining an elevation of said surface of said water and a thickness of said layer of non-aqueous phase liquids at a plurality of discrete times;

recording data corresponding to said elevation of said water surface and to said thickness of said layer of non-aqueous phase liquids at said plurality of discrete times;

sorting said data to develop a set of water surface elevation measurements for thicknesses of said layer of said non-aqueous phase liquids greater than a predetermined minimum thickness;

querying said data to determine a most persistent elevation of said water surface as measured within a predetermined deviation range;

sorting said thickness measurements of said layer of said non-aqueous phase liquids corresponding to said most persistent measured elevation of said water surface;

plotting the thickness of said layer of said non-aqueous phase liquids corresponding to each of said most persistent measured elevations of said water surface as a function of time;

examining each of said plotted thicknesses of said layer of said non-aqueous phase liquids for increases over a previous plotted thickness of said layer of said non-aqueous phase liquids; and indicating an increase in the amount of said non-aqueous phase liquids within said layer when an increase in a plotted thickness of said layer of said non-aqueous phase liquids occurs.

2. The method of claim 1, wherein said non-aqueous phase liquids comprise phase separated hydrocarbons.

3. The method of claim 1, wherein said environment comprises an underground environment, and wherein said water in said environment comprises ground water.

4. The method of claim 3, wherein said set of ground water elevation measurements is determined for phase separated hydrocarbon thicknesses greater than one-hundredth of a foot.

5. The method of claim 4, wherein said most persistent measured elevation of said surface of said ground water is within a deviation range of two tenths of a foot or greater.

6. A method for estimating a completion time for a remediation process of a layer of non-aqueous phase liquids from a surface of water in an environment, the method comprising:

determining an elevation of said surface of said water and a thickness of said layer of non-aqueous phase liquids at a plurality of discrete times;

recording data corresponding to said elevation of said water surface and to said thickness of said layer of non-aqueous phase liquids at said plurality of discrete times;

sorting said data to develop a set of water surface elevation measurements for thicknesses of said layer of said non-aqueous phase liquids greater than a predetermined minimum thickness;

querying said data to determine a most persistent elevation of said water surface as measured within a predetermined deviation range;

sorting said thickness measurements of said layer of said non-aqueous phase liquids corresponding to said most persistent measured elevation of said water surface;

plotting the thickness of said layer of said non-aqueous phase liquids corresponding to each of said most persistent measured elevations of said water surface as a function of time;

examining each of said plotted thicknesses of said layer of said non-aqueous phase liquids for a downward trend in said plotted thicknesses of said layer of said nonaqueous phase liquids;

projecting from said downward trend when said thickness of said nonaqueous phase liquids will reach near zero; and estimating the completion time for said remediation based on a duration for said thickness of said layer of said non-aqueous phase liquids to reach near zero.

7. The method of claim 6, wherein said non-aqueous phase liquids comprise phase separated hydrocarbons.

8. The method of claim 6, wherein said environment comprises an underground environment, and wherein said water in said environment comprises ground water.

9. The method of claim 8, wherein said set of ground water elevation measurements is determined for phase-separated hydrocarbon thicknesses greater than one-hundredth of a foot.

10. The method of claim 9, wherein the most persistent measured ground water elevation of said surface of said ground water is within a deviation range of two tenths of a foot or greater.

* * * * *